United States Patent [19]
Denham et al.

[11] Patent Number: 5,248,231
[45] Date of Patent: Sep. 28, 1993

[54] SELF-PLUGGING BLIND RIVET

[75] Inventors: Keith Denham, Welwyn; Laurence A. Browne, Welwyn Garden City, both of England

[73] Assignee: Avdel System Limited, Welwyn Garden City, England

[21] Appl. No.: 957,776

[22] Filed: Oct. 8, 1992

[30] Foreign Application Priority Data

Oct. 9, 1991 [GB] United Kingdom ............... 9121387

[51] Int. Cl.⁵ ............................................. F16B 13/04
[52] U.S. Cl. ........................................ 411/43; 411/38; 411/69
[58] Field of Search ...................... 411/34–38, 411/43, 69, 70

[56] References Cited

U.S. PATENT DOCUMENTS

| | | | |
|---|---|---|---|
| 4,585,383 | 4/1986 | Kraemer | 411/38 |
| 4,639,174 | 1/1987 | Denham et al. | 411/43 |
| 4,836,728 | 6/1989 | Mauer et al. | 411/43 |
| 4,988,247 | 1/1991 | Summerlin | 411/43 X |

*Primary Examiner*—Neill R. Wilson

*Attorney, Agent, or Firm*—Oblon, Spivak, McClelland, Maier & Neustadt

[57] ABSTRACT

A self-plugging blind rivet 10 comprises a tubular body 14 having a preformed head 34 at one end, and in the bore 36 of which a headed stem 12 is disposed. The stem 12 projects from the head 34 end of the body 14, and the head 18 of the stem 12 is substantially enclosed by a region 42 of the body 14 remote from the preformed head 34. The head 18 of the stem 12 abuts a shoulder 44 provided by a region 43 of the body 14 in which the diameter of the bore 36 is reduced and the wall is thickened. Axially spaced apart annular grooves 46, 48 in the external surface of the body 14 define between them a portion 50 which will collapse to form a blind head when the body 14 is compressed axially by pulling the stem 12 while supporting the preformed head 34. Finally, the stem head 18 may be pulled into the reduced diameter region 40 of the bore 36 and thereby cause the blind head to be reshaped and forced into compressive engagement with work being fastened. The stem head 18 remains securely enclosed by the body 14, whereby its loss is prevented.

3 Claims, 2 Drawing Sheets

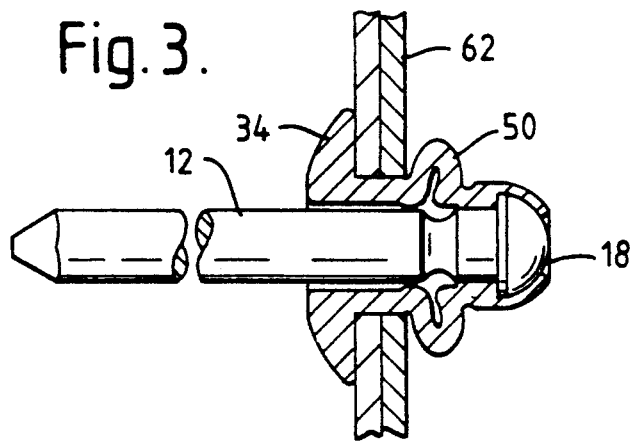
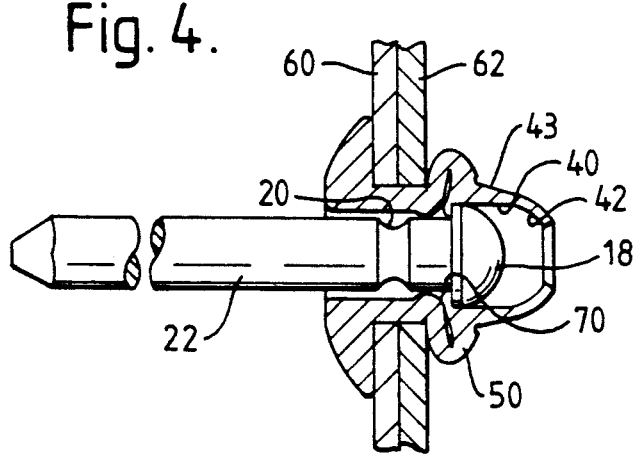
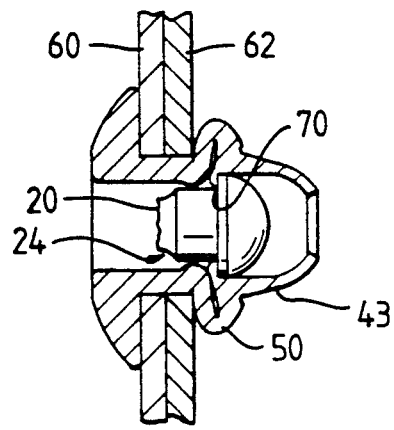

SELF-PLUGGING BLIND RIVET

BACKGROUND OF THE INVENTION

1. Field of the Invention

This invention relates to a self-plugging blind rivet comprising an elongate, generally cylindrical, stem having a radially enlarged head at one of its ends, and a tubular body having a shank, and a radially enlarged preformed head at one end of the shank for engaging one face of a workpiece, the stem extending through an axial bore in the body and projecting from the head end of the body, and the head of the stem abutting a radially extending face of the shank at a position spaced from the preformed head, whereby, on pulling the projecting stem and supporting the pre-formed head of the body in order to set the rivet, a portion of the shank between the preformed head and the head of the stem may be caused to collapse axially into an annular bulge or fold which projects radially outwardly of the shank, and constitutes a "blind head" which can be forced into engagement with the opposite, or "blind", face of the workpiece, and thus members of the workpiece can be fastened together between the pre-formed head and the blind head constituted by the annular bulge or fold.

2. Description of the Related Art

Usually, although not necessarily, the stem is provided with a breakneck at which it will break, when the setting of the rivet is complete, leaving a part of the stem, including the stem head, plugging the bore of the body, while another part of the stem, known as the stem-tail, is removed from the set rivet and discarded. It is usually required that rivets of the kind referred to should have the ability to clamp the members of the workpiece tightly together between the pre-formed head and the blind head, and also that the stem, or part thereof, which remains in the body of the set rivet should be retained within the body so as to reduce the risk of it becoming separated accidentally to form unwanted debris and leaving an opening through the bore.

One particularly successful and well known type of rivet of the foregoing kind, is sold under the Registered Trade Mark "AVEX", and is described in German Offenlegungsschrift No.2625023.

In the "AVEX" rivet, the head of the stem is external to the body, and abuts the end of the body remote from the pre-formed head (that is, the "tail-end" of the body). The stem has a breakneck spaced from its head and a short portion, immediately adjacent to its head, in which the diameter of the stem is reduced. A portion of the shank of the body adjacent to the tail end is crimped on to the reduced diameter portion of the stem, and has the same external diameter as the head of the stem. Due to this construction, the head of the stem remains in abutment with the tail end of the body, and has no tendency to enter the bore, during setting of the rivet, and the part of the stem which remains as a plug in the body of the set rivet is positively retained by the crimped engagement of the tail portion of the body with the reduced diameter portion of the stem.

Furthermore, it has also been found that, in the known "AVEX" rivet, although the blind head formed by bulbing of the shank of the body adequately engages the workpiece around the edge of the hole in which the rivet is installed, it does not normally enter into clamping engagement with a significant area of the blind face of the work.

With rivets of the kind referred to, we have also encountered a problem in that, occasionally the head of the stem would break off from the shank, either prematurely so that proper installation of the rivet could not be completed, or near the final stage of setting the rivet so that the broken-off stem head might form dangerous debris, and leave the fastener in an unstable condition.

We therefore sought to overcome this problem by reducing the diameter of the head of the stem and enclosing it in a counterbored portion at the end of the body remote from the pre-formed head. However, it was found that, due to the consequently reduced area of abutment between the stem head and the body, the stem head had a tendency to enter and pass along the bore of the body before it had applied sufficient axially compressive force to cause the body to collapse and form a satisfactory blind head. Since the size of the rivet is related to the diameter of the shank of the body and particularly its tail portion, it is not possible to significantly increase the area of contact between the stem head and the body without sacrificing other important parameters.

We have now found a way in which such a rivet can be made so as to perform satisfactorily even though the stem head is of sufficiently small diameter as to be enclosed by the body.

SUMMARY OF THE PREFERRED EMBODIMENT

According to the present invention, there is provided a self-plugging blind rivet comprising a tubular rivet body and an elongate stem;

the body having an elongate shank, a radially enlarged pre-formed head at one end of the shank and an axial bore extending through the head and shank;

the stem comprising an elongate shank having a breakneck adjacent to one of its ends, and a radially enlarged stem head at the said one end, the breakneck dividing the stem into a stem-tail, and a plug including the stem head;

characterised in that the shank of the stem has a substantially constant diameter throughout its length, and the enlarged stem head has a diameter smaller than the external diameter of the shank of the body; the shank of the body has a thin-walled portion adjacent to the pre-formed head, a thick-walled portion spaced from the pre-formed head by the thin-walled portion, and a counterbored portion extending from the thick-walled portion to the tail-end of the shank;

the bore of the body has a region of reduced diameter intermediate between its ends, in which the shank of the stem is a push-fit, a main region extending from the head end of the bore to the reduced region and in which the shank of the stem is clearance fit, and a counterbored region within the said counterbored portion of the shank and extending from the reduced region to the tail-end of the body, the shank of the body presenting an annular abutment face at the junction of the reduced and counterbored regions of the bore; the stem head is disposed in the counterbored region and in abutment with the abutment face;

the external surface of the shank of the body is generally cylindrical, with the counterbored portion having been deformed so as to substantially enclose the head of the stem, and the external surface of the shank of the body is provided with a narrow folding groove at a position intermediate between the pre-formed head and the thick-walled portion, and a stop groove in the thick-walled portion at a position close to that end of the thick walled portion nearest the thin-walled portion, the folding groove and the stop groove being spaced apart and defining a collapsible portion of the shank between them at which portion the shank will, under axial compression between the pre-formed head and the abutment face, collapse preferentially to form a blind head.

BRIEF DESCRIPTION OF THE INVENTION

Embodiments of the invention will now be described, by way of example, with reference to the accompanying drawings, in which:

FIGS. 2, 3, 4 and 5 are views, similar to FIG. 1, showing successive stages in the installation of the rivet in the workpiece.

Figure 1:
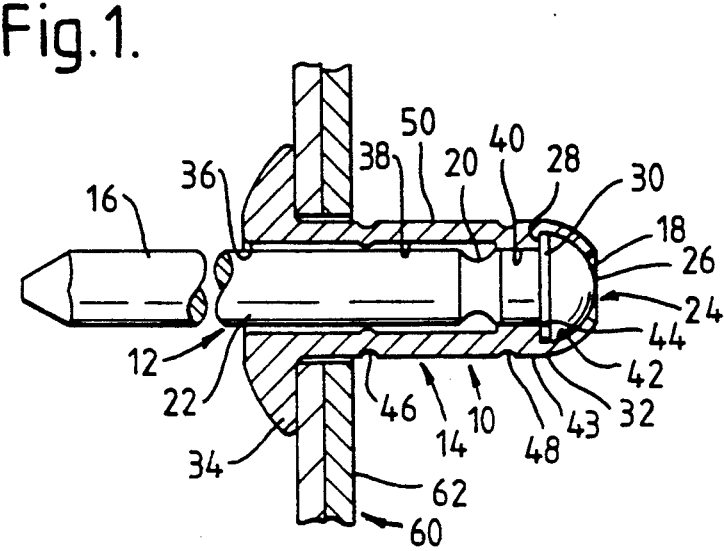
FIG. 1 is a sectional elevation showing a self-plugging blind rivet according to the invention, and an apertured workpiece in which the rivet is disposed, and ready to be installed.

A self-plugging blind rivet 10 comprises a stem 12 and a tubular rivet body 14.

The stem 12 is formed of cold drawn mild steel, and comprises a generally cylindrical, elongate, shank 16, having an integral radially enlarged head 18 of mushroom shape at one end, and a breakneck 20 spaced a short distance from the head 18. The breakneck is made the weakest part of the stem by reducing the cross-sectional area of the shank 16 so that the stem will break at the breakneck when subjected to a predetermined tensile load.

The breakneck 20 demarcates the stem into a stem-tail 22 and a plug 24 which includes the head 18 and a short portion of the shank 16.

The head 18 presents a part-spherical face 26 directed away from the stem-tail 22, and a flat annular abutment face 28 which faces towards the stem-tail. The head 18 has an axially short, cylindrical, broaching portion 30 joining the part-spherical face 26 and the abutment face 28.

The body 14 is formed of low carbon mild steel, and is tubular, and comprises a generally cylindrical elongate shank 32, and, at one end of the shank, a radially enlarged pre-formed head 34. A bore 36 extends axially throughout the head and shank of the body.

The rivet 10 is an assembly of stem 12 and body 14 in which the stem is disposed within the bore of the body.

The bore 36 has a main region 38 extending through the preformed head and a substantial distance into the shank 32, a region 40 of reduced diameter spaced from the preformed head by the main region 38, and a counterbored region 42 extending from the region 40 to the end of the shank 32 remote from the pre-formed head 34.

That portion of the shank 32 which surrounds the reduced region 40 of the bore, and which is hereinafter referred to as "the thick-walled portion 43", has a wall-thickness which is increased by an amount corresponding to the reduction in diameter of the bore in the reduced region 40. The thick-walled portion presents a radially extending face in the form of an annular shoulder 44 facing into the counterbored region 42 at the junction of the counterbored region and the region 40 of reduced diameter.

In the assembled rivet 10, the head 18 of the stem lies in the counterbored region 42 with its abutment face 28 in abutment with the annular shoulder 44, and the counterbored end portion of the shank will have been deformed so that it has come to lie substantially in engagement with the part-spherical face 26 of the stem head 18, and thus forms an involucre which substantially encloses the stem head and retains it within the body.

The shank of the stem extends from the stem head within the involucre, through the region 40 of reduced diameter in which it is a push-fit, through the main region of the bore in which it fits with substantial clearance, and the stem-tail 22 projects from the end of the bore beyond the pre-formed head.

The external surface of the shank 32 of the body is provided with two axially spaced-apart circumferential grooves 46, 48 of part-circular shape in cross-section.

The groove 46, also referred to as "the folding groove 46", is formed in such a manner, and is so positioned, as to influence and promote the correct behaviour of the body during setting of the rivet 10, and more particularly to ensure that, when the shank 32 is subjected to axial compression and caused to collapse axially, bulbing and folding of the shank occurs at a position and in a manner appropriate to form a blind head of suitable shape which will clamp members of a workpiece tightly together.

To this end, the folding groove 46, is formed in the external surface of the shank at a position external to the main region of the bore and intermediate between the pre-formed head and the thick-walled portion 43. Thus, the groove 46 is spaced from the preformed head by a distance corresponding to the minimum thickness of work which the fastener is intended to accommodate, and from the region 40 by a collapsible portion 50 of the shank having a length sufficient to form a blind head of suitably large diameter to engage the workpiece securely.

The folding groove 46 may be formed either before or after assembling the body with the stem, and may be formed in any manner suitable to produce a slight weakening of the shank in the region of the groove such that, during bulbing of the shank under axial compression, the material of the shank will bend preferentially in the region of the groove 46, and thus confine the bulb to the portion 50 between the groove 46 and the thick walled portion 43 of the shank.

Thus, in this embodiment, the groove 46 is formed before assembly by rolling, but alternatively it may be formed by, for example, cutting or crimping the body.

The groove 48, also referred to as "the stop groove 48", is formed in the external surface of thick-walled portion 43 of the shank, by either rolling or crimping, so as to provide a slight stepped reduction in the external diameter of the thick-walled portion at a position close to, but spaced from, the end of the thick-walled portion nearest the collapsible portion 50.

The width of the groove 48 is not important: it could, for example, extend substantially the whole length of the thick-walled portion. However the depth of the groove is of some importance, in that it should not unduly weaken the thick-walled portion of the body, because it is important that the thick-walled portion should be able to resist distortion by such axially compressive force as will be sufficient to cause bulbing of the collapsible portion 50.

In this embodiment, the depth of the groove 48 is approximately one quarter of the wall-thickness of the thick-walled portion 43.

The stop groove 48 serves to delimit the end of the collapsible portion 50 remote from the other groove 46, and thus ensures that there is little or no tendency for part of the thick-walled portion 43 adjacent to the collapsible portion 50 to form part of the bulb, and thus expand radially away from the shank 16 of the stem 12. This is important because, ultimately, material of the thick-walled portion in a region adjacent to the bulbed collapsible portion will be relied upon to provide a stop for arresting movement of the stem head 18 along the bore towards the pre-formed head.

The spacing between the grooves 46 and 48 is preferably approximately equal to the external diameter of the shank 32, in order to ensure that, when collapsed and folded, the portion of the shank 32 between the grooves will form a blind head of suitably greater diameter than that of the shank.

The behaviour of a rivet according to the invention will now be described with reference, by way of example, to the installation of the rivet 10 in a workpiece of the minimum thickness for which the rivet is designed.

Referring first to FIG. 1, the workpiece is indicated by the reference 60, and comprises two sheets having registering apertures of slightly greater diameter that of the shank 32 of the body of the rivet.

The shank of the rivet is inserted into the apertures so that the pre-formed head abuts one face of the workpiece (known as the "near face"), and the shank of the body extends through the workpiece and projects beyond the opposite face of the workpiece (hereinafter referred to as "the blind face 62").

As previously mentioned, the thickness of the workpiece 60 is the minimum for the rivet 10, and it will be noted that the blind face 62 of the workpiece is substantially aligned with that side of the folding groove 46 which is nearer the pre-formed head 34 of the rivet. Thus, the entire length of the collapsible portion 50 projects beyond the workpiece.

A conventional breakstem rivet-setting tool (not shown) is then used to grip and pull the projecting stem-tail 22 while supporting the rivet body 14 against movement by abutting the pre-formed head 34. This causes a progressive deformation of the body, due to the axial compression of the body between the abutting tool and the stem head 18 which is in abutment with the annular abutment face 28.

Figure 2:
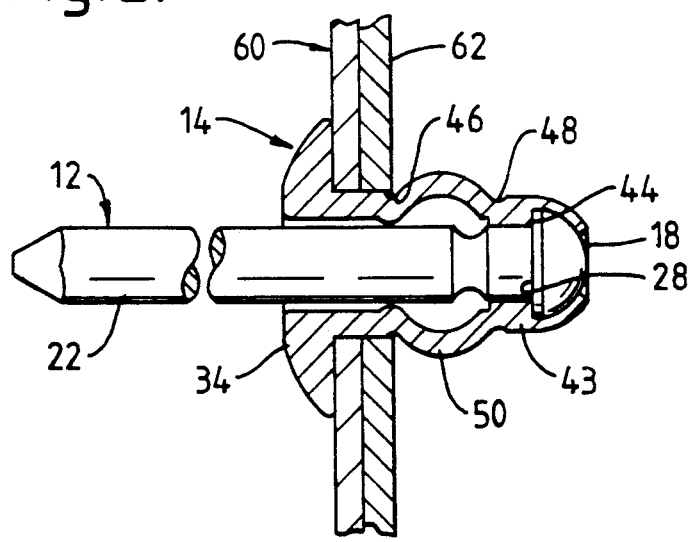

The first stage of this deformation is shown in FIG. 2, where it will be seen that the axial length of the portion of the shank 32 between the pre-formed head 34 and the stem head 18 has been shortened, the portion of the shank 32 of the body within the workpiece has increased in diameter to fill the apertures in the workpiece, and the collapsible portion 50 between the grooves 46, 48 has begun to bulb, and has become barrel-shaped, with a major diameter already greater than that of the apertures in the workpiece.

With continued application of force by the tool, bulbing of the collapsible portion continues, and its major diameter increases, until the collapsible portion becomes folded double and its axially opposite ends meet, as shown in FIG. 3.

At this stage, the collapsible portion 50 can be regarded as a blind head, and it then tends to resist further deformation. With the continuing application of force greater than that previously applied by the tool, the stem head 18 begins to enter the reduced region 40 of the bore, and thus to radially expand the thick-walled portion 43 of the body as it moves towards the pre-formed head. It may be that some swaging of the internal surface of the thick-walled portion 43 by the stem head accompanies the radial expansion at this stage, and, if so, this probably contributes to the formation of a build-up of material which ultimately resists further movement of the stem head along the bore.

However, that may be: as the stem head passes along the reduced region 40, expanding the thick-walled portion 43, and approaches that end of the thick-walled portion adjacent to the now folded collapsible portion, there is left an annular rib 70 of body material, radially inwardly of that limb of the folded collapsible portion adjacent to the now expanded thick-walled portion, and which is very resistant to expansion by the stem head.

The full force applied by the tool is therefore transmitted by the stem head to the annular rib 70, and this, in combination with the expansion of the thick-walled portion, further deforms the folded collapsible portion or blind head, so that that limb of the folded collapsible portion which is nearer the blind face 62 of the workpiece tends to move towards the pre-formed head and so becomes closely adpressed to the blind face 62 and tends to become flattened against the blind face. Thus, the formation of the blind head is completed, with the blind head engaging the blind face 62 over a substantial area and, in co-operation with the preformed head 34, applying a great clamping force to the sheets forming the workpiece, whereby the sheets are tightly clamped together and held by the rivet. This stage is shown in FIG. 4.

With the continued application of yet greater force by the tool, the stem breaks at the breakneck 20, allowing the stem-tail to be withdrawn and discarded, and leaving the stem head and a short piece of the shank of the stem within the body of the thus completely installed rivet as shown in FIG. 5.

It will, of course, be appreciated that the rivet is so designed that it will behave during the setting operation, substantially in the manner described, in which the setting of the rivet proceeds in stages of which three principal stages are distinct.

These three stages are, first, the bulbing and folding of the collapsible portion 50, accompanied by holefilling of the apertures in the workpiece, and second, the entry of the stem head into the reduced region of the bore, accompanied by radial expansion of the thick-walled portion 43, reshaping of the folded collapsible portion 50, and the formation of the annular rib 70 which ultimately acts as a stop to prevent further movement of the stem head along the bore, and, third and finally, the breaking of the breakneck.

Thus, it will be appreciated, first that the breakneck must be capable of transmitting all the force required to set the rivet, and yet of yielding when opposed by the annular rib 70, so that the stem head cannot be pulled entirely through the bore by swaging out the annular rib 70.

Second, it will be appreciated that the strength of the annular shoulder 44 presented by the thick-walled portion 43, and the area of mutual contact between the annular shoulder and the abutment face 28 of the stem head, must, on the one hand, be such as to withstand the forces required to deform, and fold double, the collapsible portion 50 without, at that stage, allowing penetration of the stem head into the reduced region 40 of the bore, and on the other hand, must be such that, once the collapsible portion has been folded double, the annular shoulder will yield, allowing the stem head to enter the reduced region 40 of the bore and so to expand the thick-walled portion, and cause the formation of the annular rib 70 of material ahead of the stem head.

It will, of course, be understood that the annular rib 70 is supported against radially outward expansion by the restraining hoop forces generated by the limbs of the folded collapsible portion, and that the workpiece itself affords some support against shearing-off of the annular rib 70 by the stem head. Thus, the annular rib must have sufficient strength, when so supported, as to resist further movement of the stem head so that the breakneck will yield, rather than the annular rib.

These are matters of fine judgement, and for experiment, to be exercised by the person skilled in this art. It is not thought to be possible to give more precise information as to how the requirements are to be met, since many variables are involved.

However, by way of specific example, reference will now be made to the more important dimensions of a specific working embodiment of the rivet 10, the stated dimensions being approximate.

In the embodiment of this example, the rivet is designed for use in a workpiece having a thickness of not less than 2.0 mm and not greater than 3.6 mm, and registering apertures, in which the rivet is to be installed, having a diameter of 5.2 mm.

Thus, the shank of the body has a diameter of 4.8 mm, and a length of 11.13 mm, before deformation of the counterbored portion to enclose the stem head. The main region of the bore has a diameter of 3.33 mm, and the reduced diameter region has a diameter of 2.74 mm. The diameter of the counterbored region is 4.14 mm, and the diameter of the stem head is 3.98 mm. Thus, the area of abutment between the abutment face 28 of the stem head and the annular shoulder 44 is 6.54 mm$^2$.

The diameter of the shank 16 of the stem is 2.75 mm, thus providing a interference fit in the region 40 of reduced diameter in the bore.

The length of the thin-walled portion of the shank around the main region of the bore is 7.31 mm, and the length of the thick-walled portion 40 is 1.45 mm. Thus, the annular shoulder 44 is spaced from the pre-formed head 34 by a distance of 8.77 mm.

The length of the collapsible portion 50, between the grooves 46, 48, is 4.775 mm and the wall thickness of the collapsible portion is 0.735 mm, compared with a wall thickness of 1.03 mm for the thick-walled portion 40.

The body was formed of steel having a carbon content of 0.1% and annealed to a hardness of $HV_{10}90$.

The breakneck of the stem was designed to have a breaking strength of 6117 Newtons.

The invention is not limited to the details of the foregoing embodiments.

We claim:

1. A self-plugging blind rivet comprising a tubular rivet body and an elongate stem;

the body having an elongate shank, a radially enlarged pre-formed head at one end of the shank and an axial bore extending through the head and shank;

the stem comprising an elongate shank having a breakneck adjacent to one of its ends, and a radially enlarged stem head at the said one end, the breakneck dividing the stem into a stem-tail, and a plug including the stem head;

characterised in that the shank of the stem has a substantially constant diameter throughout its length, and the enlarged stem head has a diameter smaller than the external diameter of the shank of the body;

the shank of the body has a thin-walled portion adjacent to the pre-formed head, a thick-walled portion spaced from the pre-formed head by the thin-walled portion, and a counterbored portion extending from the thick-walled portion to the tail-end of the shank;

the bore of the body has a region of reduced diameter intermediate between its ends, in which the shank of the stem is a push-fit, a main region extending from the head end of the bore to the reduced region and in which the shank of the stem is clearance fit, and a counterbored region within the said counterbored portion of the shank and extending from the reduced region to the tail-end of the body, the shank of the body presenting an annular abutment face at the junction of the reduced and counterbored regions of the bore; the stem head is disposed in the counterbored region and in abutment with the abutment face;

the external surface of the shank of the body is generally cylindrical, with the counterbored portion having been deformed so as to substantially enclose the head of the stem, and the external surface of the shank of the body is provided with a narrow folding groove at a position intermediate between the pre-formed head and the thick-walled portion, and a stop groove in the thick-walled portion at a position close to that end of the thick walled portion nearest the thin-walled portion, the folding groove and the stop groove being spaced apart and defining a collapsible portion of the shank between them at which portion the shank will, under axial compression between the pre-formed head and the abutment face, collapse preferentially to form a blind head, whereby, on pulling the stem relative to the body to set the rivet in a workpiece, the collapsible portion will bulb and fold, and then the stem head will enter the region of reduced diameter, thereby radially expanding the thick-walled portion and forming an annular rib and deforming the folded collapsible portion so that it tends to move towards the pre-formed head, and then the breakneck will break.

2. A self-plugging blind rivet as claimed in claim 1, wherein the abutment face of the stem head is flat.

3. A self-plugging blind rivet as claimed in either of claims 1 or 2, wherein the stop groove is of part circular shape in cross-section.

* * * * *